US011498598B2

(12) United States Patent
Wolle et al.

(10) Patent No.: US 11,498,598 B2
(45) Date of Patent: Nov. 15, 2022

(54) TRANSPORT VEHICLE AND TRANSPORT DEVICE

(71) Applicant: TANOS GmbH Verpacken Ordnen, Illertissen (DE)

(72) Inventors: Lutz Wolle, Burlafingen (DE); Tjeerd Jan Pieter Gerbranda, Leipheim (DE); Scott Hoekstra, The Hague (NL)

(73) Assignee: TANOS GmbH Verpacken Ordnen Präsentieren, Illertissen (DE)

( * ) Notice: Subject to any disclaimer, the term of this patent is extended or adjusted under 35 U.S.C. 154(b) by 62 days.

(21) Appl. No.: 17/059,785

(22) PCT Filed: Jun. 1, 2018

(86) PCT No.: PCT/EP2018/064484
§ 371 (c)(1),
(2) Date: Nov. 30, 2020

(87) PCT Pub. No.: WO2019/228647
PCT Pub. Date: Dec. 5, 2019

(65) Prior Publication Data
US 2021/0206411 A1    Jul. 8, 2021

(51) Int. Cl.
*B62B 1/26* (2006.01)
*B62B 1/12* (2006.01)
*B62B 5/06* (2006.01)

(52) U.S. Cl.
CPC ............... *B62B 1/125* (2013.01); *B62B 1/26* (2013.01); *B62B 5/064* (2013.01); *B62B 2202/12* (2013.01); *B62B 2206/06* (2013.01)

(58) Field of Classification Search
CPC .. B62B 1/25; B62B 1/26; B62B 5/064; B62B 2202/12; B62B 2206/06
See application file for complete search history.

(56) References Cited

U.S. PATENT DOCUMENTS 7,367,571 B1    5/2008    Nichols

FOREIGN PATENT DOCUMENTS

| DE | 10155588 |   | 4/2003 |   |
|----|----------|---|--------|---|
| DE | 10155588 | A1 | 4/2003 |   |
| DE | 10307394 |   | 10/2003 |   |
| DE | 10307394 | A1 * | 10/2003 | ............ B62B 3/006 |
| DE | 10307394 | A1 | 10/2003 |   |
| EP | 2315701 |   | 5/2011 |   |
| EP | 2315701 | A1 | 5/2011 |   |

OTHER PUBLICATIONS

"Sys-Roll", Systainer, Verpacken Ordnen Prasentieren Transportieren, Tanos GmbH, 2 pages, 2014/2015.

* cited by examiner

*Primary Examiner* — Bryan A Evans
(74) *Attorney, Agent, or Firm* — Hoffmann & Baron, LLP

(57) ABSTRACT

A transport vehicle having a handle for moving the transport vehicle into a tilted position, and two wheels for supporting the transport vehicle in the tilted position relative to a floor and moving the transport vehicle relative to the floor. Above a container attachment interface, the transport vehicle has a pull-out assembly arranged on a vertical frame section with a horizontal pull-out container accommodation element for accommodating a box-shaped container. The pull-out assembly has an attachment mechanism with which the pull-out assembly can be continuously positioned vertically relative to the vertical frame section in a state attached to the vertical frame section.

11 Claims, 12 Drawing Sheets

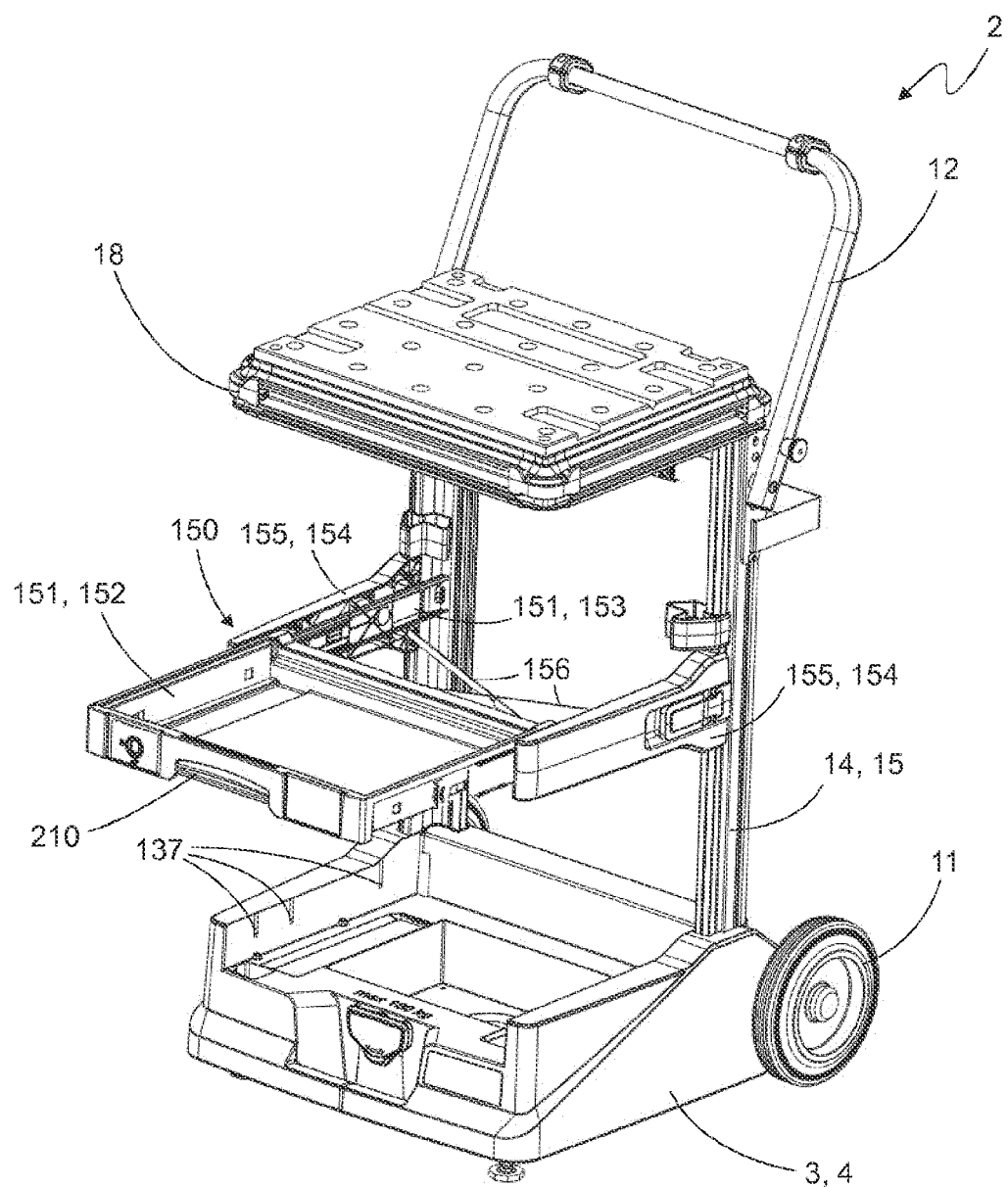
Fig. 3

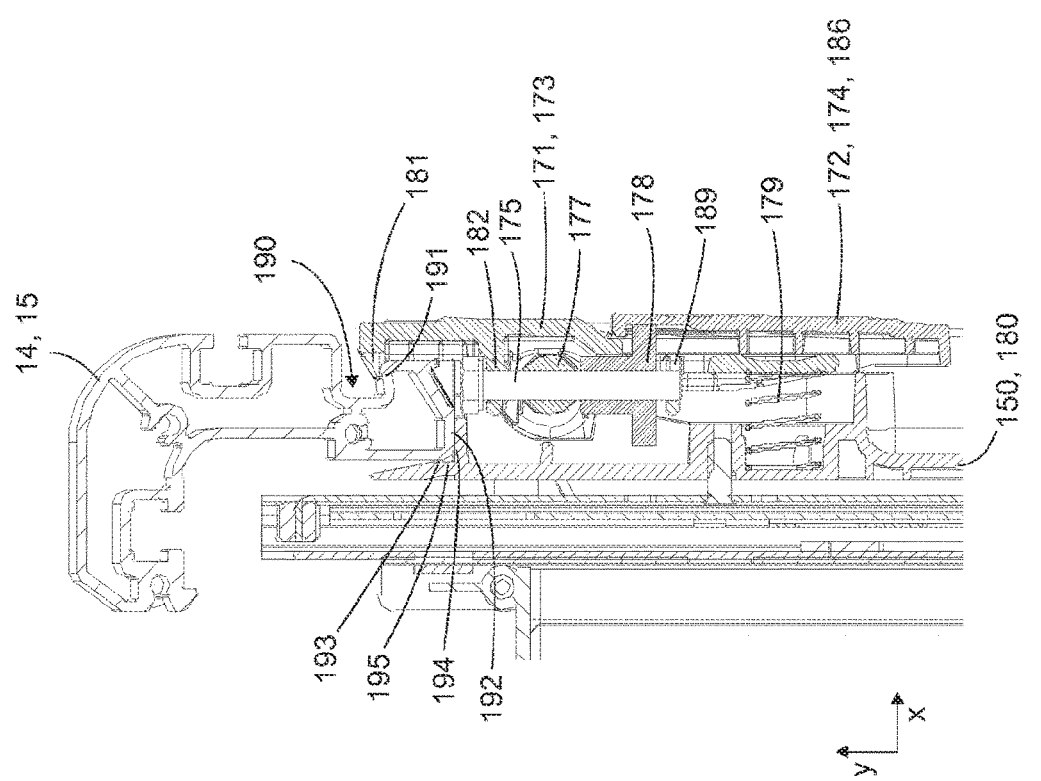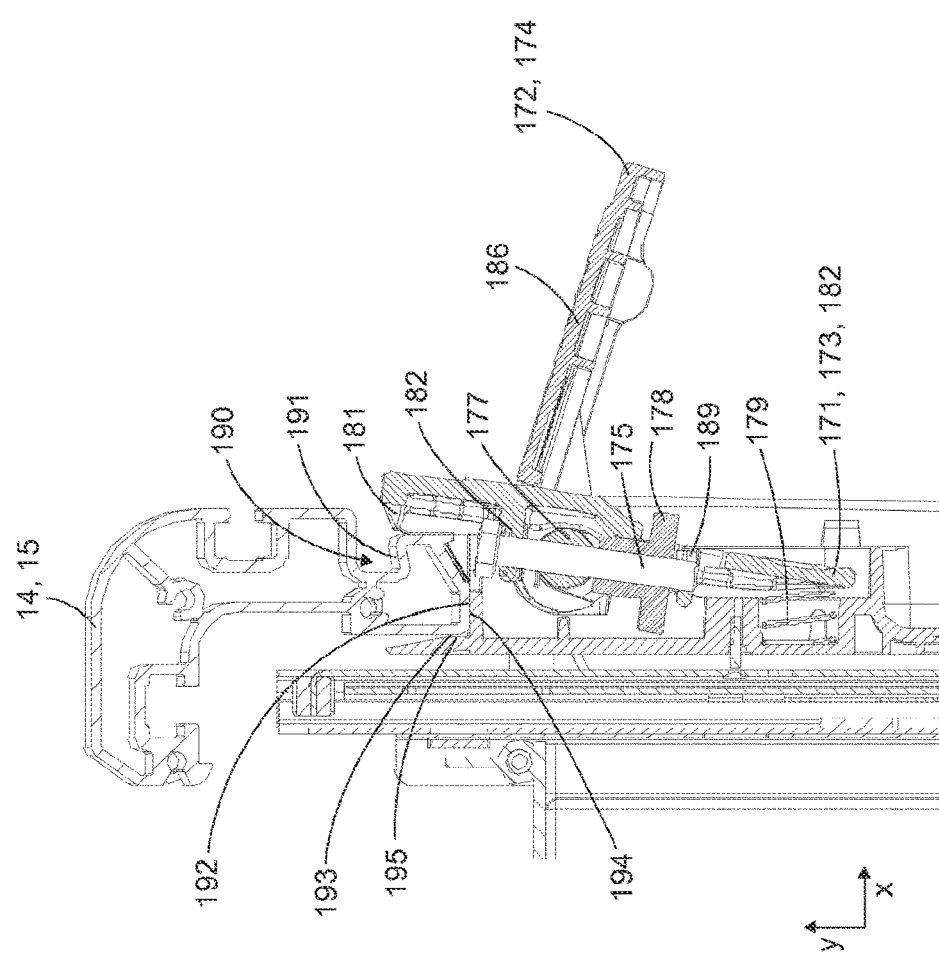

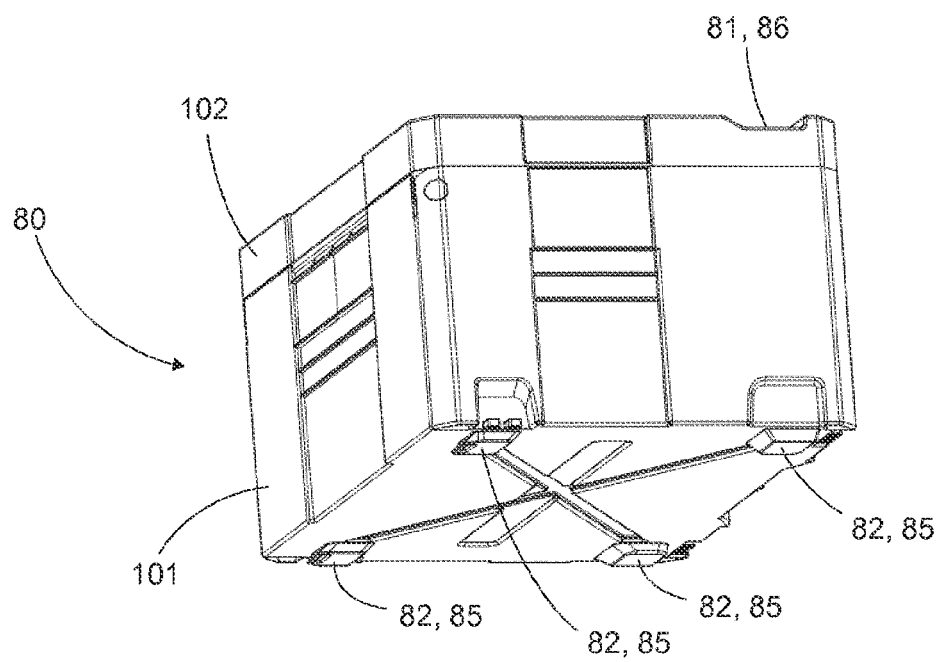
Fig. 13
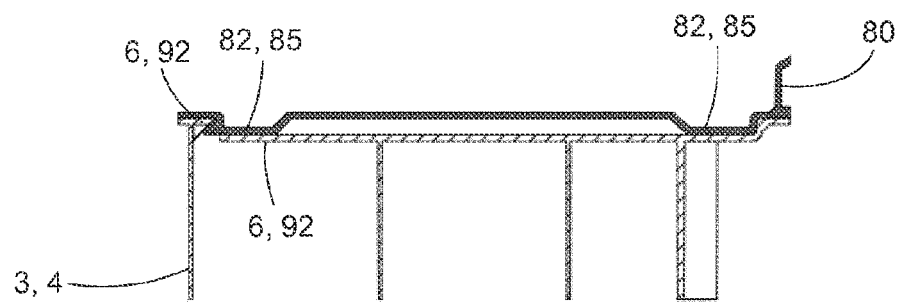
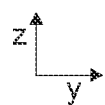
Fig. 14

TRANSPORT VEHICLE AND TRANSPORT DEVICE

This application claims priority based on an International Application filed under the Patent Cooperation Treaty, PCT/EP2018/064484, filed on Jun. 1, 2018.

BACKGROUND OF THE INVENTION

The invention relates to a transport vehicle, comprising: a vehicle body having a lower section and a vertical frame section extending upwards from the lower section, the lower section having a storage surface and a container attachment interface for attaching a box-shaped container to the lower section in a state in which the box-shaped container is placed on the storage surface, a handle arranged on the vehicle body for moving the transport vehicle into a tilted position, and two wheels located on the lower section for supporting the transport vehicle against a floor and moving the transport vehicle relative to the floor in the tilted position.

Such a transport vehicle is known from the state of the art. For example, the product "Sys-Roll" available from the company TANOS GmbH is known as a transport vehicle for the transport of box-shaped containers.

The transport vehicle mentioned at the beginning is typically used to transport one or more box-shaped containers to a job site, for example a construction site. The box-shaped container is usually used to store tools, for example a power tool, and/or tool accessories. In particular, the box-shaped containers are designed in such a way that they can be stacked on top of each other and coupled together in a vertically tension-proof manner to form a stable vertical, in particular cuboid, stack. To this end, each box-shaped container has the same horizontal outline and has couplers enabling them to be coupled together. The stack can be placed with the lowest box-shaped container on the storage surface of the transport vehicle and attached by means of the container attachment interface. Expediently, the stack is attached to the transport vehicle with only the lowest box-shaped container. The vehicle body, especially the vertical frame section, represents a permanently integral structure; i.e. the vehicle body, especially the vertical frame section, remains unchanged in its structure when a box-shaped container is attached and removed. The box-shaped container can be removed from and/or attached to the transport vehicle without the use of tools.

The transport vehicle can be manually moved to a tilted position in which the transport vehicle is tilted with respect to the floor about a tilting axis defined by the wheels. In this position, the transport vehicle can be moved, especially pushed or pulled, in the manner of a sack truck. The transport vehicle can also be described as a "sack truck like" or sack truck.

A combination of the transport vehicle and the goods to be transported with it, for example the box-shaped container mentioned above, shall be referred to as the transport device.

SUMMARY OF THE INVENTION

It is an object of the invention to improve the operability of the transport device.

The object is solved by a transport vehicle according to claim 1. The transport vehicle has above the container attachment interface a pull-out assembly arranged on the vertical frame section with a horizontal pull-out container accommodation element for accommodating the box-shaped container, the pull-out assembly having an attachment mechanism with which the pull-out assembly in a state attached to the vertical frame section can be steplessly positioned vertically with respect to the vertical frame section.

A user of the transport vehicle can therefore adjust the desired height of the pull-out assembly in a very comfortable way. Because the height of the pull-out assembly can be adjusted in a stepless manner when it is attached to the vertical frame section, the user can easily move the pull-out assembly up or down until the desired position is reached. It is not necessary to remove and re-attach the pull-out assembly to adjust the height. As explained in detail below, the attachment mechanism is designed in such a way that the pull-out assembly can then be fixed vertically in the desired position in a simple manner—especially without the use of tools.

Further embodiments are defined in the dependent claims.

BRIEF DESCRIPTION OF THE DRAWINGS

Exemplary details and embodiments are explained below with reference to the figures. Thereby shows:

FIG. 3 a transport vehicle with a pulled-out pull-out assembly,

FIG. 7 a sectional view of the attachment mechanism,

FIG. 8 another sectional view of the attachment mechanism,

FIG. 13 a box-shaped container,

FIG. 14 a sectional view through a container attached to the transport vehicle and FIG. 15 a container placed on a storage surface of the transport vehicle.

DETAILED DESCRIPTION

In the following explanations, reference is made to the x-direction, y-direction and z-direction drawn in the figures. The x-direction, y-direction and z-direction are orthogonal to each other. The x-direction can also be referred to as transverse direction, the y-direction as longitudinal direction and the z-direction as vertical direction. Furthermore, the x-direction and the y-direction can also be called horizontal directions. The reference system for the directions is the transport vehicle 2 or the transport device 1 in an upright position.

Figure 1:
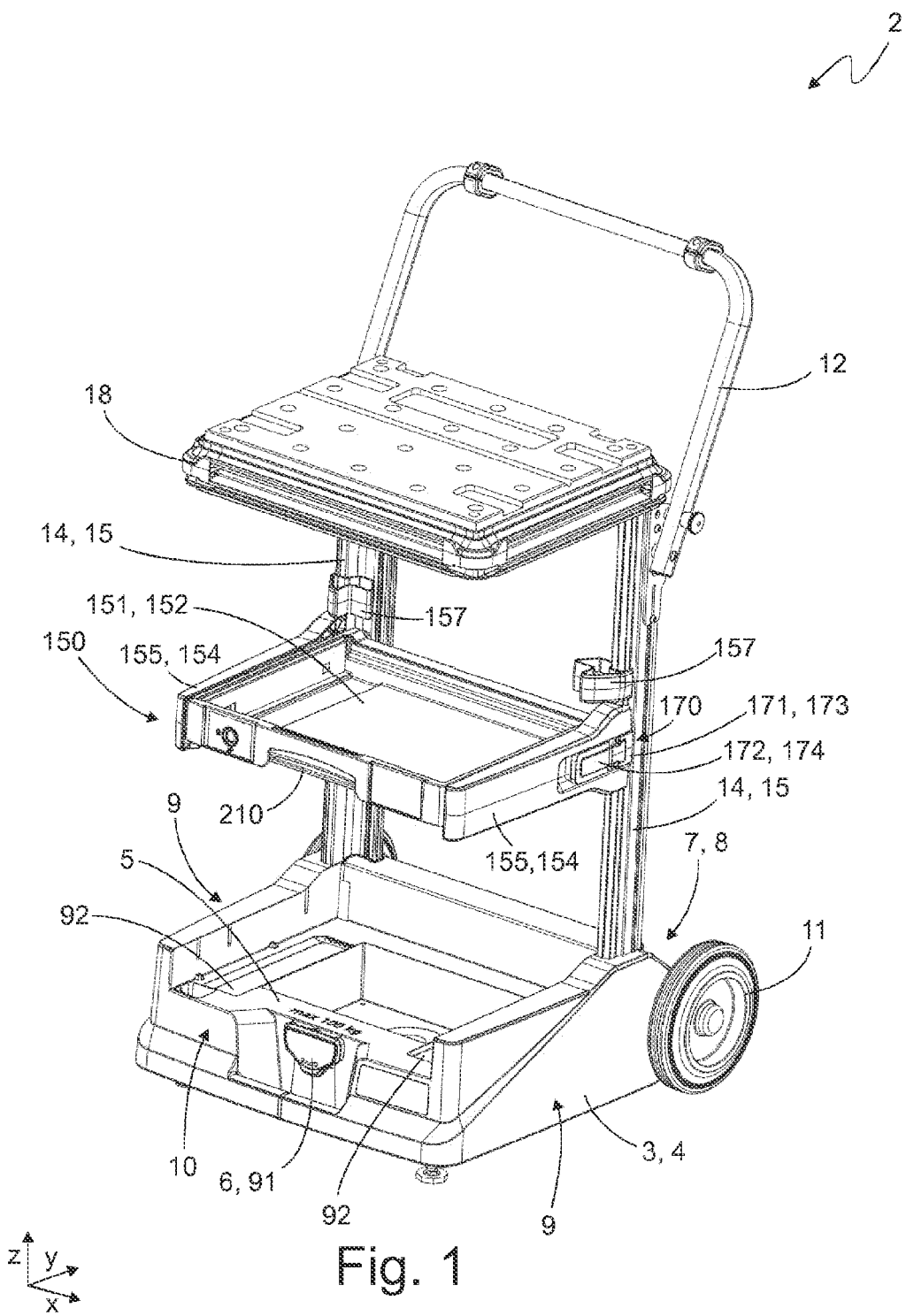
FIG. 1 a transport vehicle with a pull-out assembly.
Figure 4:
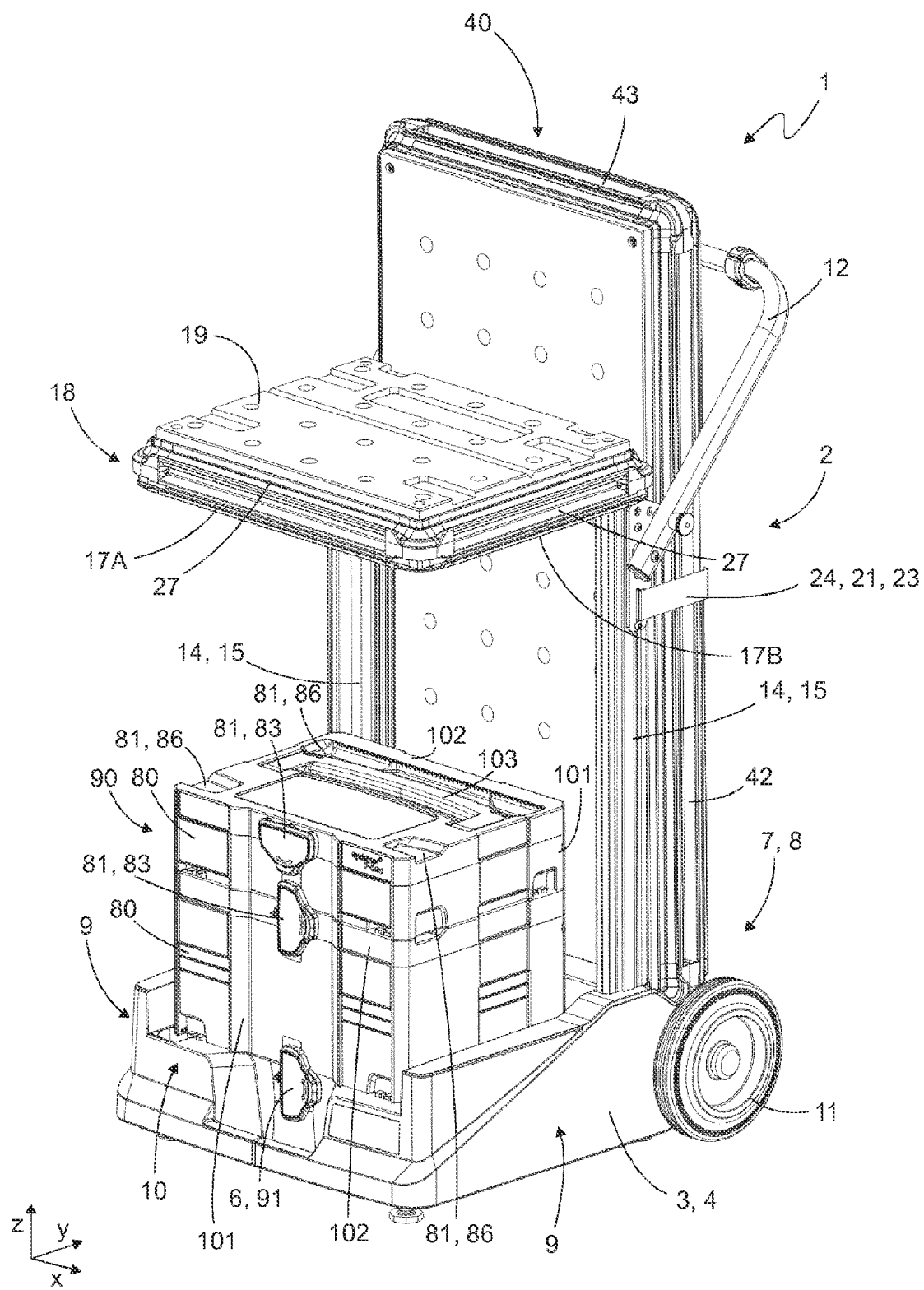
FIG. 4 a transport device with a vertical stack of containers.

FIG. 1 shows a transport vehicle 2, which comprises a vehicle body with a lower section 3 and a vertical frame section 14 extending upwards from the lower section 3. The lower section 3 has a storage surface 5 and a container attachment interface 6, which allows the first box-shaped container 80 to be attached to the lower section 3 when placed on the storage surface 5. For example, a container 80 placed on the storage surface 5 and attached to the container attachment interface 6 is shown in FIG. 4.

The transport vehicle 2 further comprises a handle 12 located on the vehicle body, by means of which the transport vehicle 2 can be moved into a tilted position, and two wheels 11 located on the lower section 3, by means of which the transport vehicle 2 can be supported against a floor and moved relative to the floor in the tilted position.

Above the container attachment interface 6, the transport vehicle 2 has a pull-out assembly 150 arranged on the vertical frame section 14 with a horizontally extendable container accommodation element 152 for accommodating the box-shaped container 80. The pull-out assembly 150 comprises a attachment mechanism 170 with which the pull-out assembly 150 in a state attached to the vertical frame section 14 can be positioned and in particular fixed in a vertically stepless manner in relation to the vertical frame section 14.

Further exemplary details are explained below.

First to the basic construction of the transport vehicle 2:

The transport vehicle 2 is shown in FIG. 1 on its own—i.e. without the box-shaped container 80. The transport vehicle 2 has a transverse front side 10, two longitudinal sides 9 and a transverse rear side 8.

The transport vehicle 2 can assume a standing position, in which it stands stable on the floor. In the standing position the lower section 3 is parallel to the floor and the vertical frame section 14 is perpendicular to the floor. The transport vehicle 2 can further assume a driving position in which it is tilted relative to the floor, for example by approximately 45 degrees. In the driving position, the transport vehicle 2 can be set in motion by manual pushing or pulling. The transport vehicle 2 can therefore be handled like a sack truck and can also be described as a sack truck like.

The transport vehicle 2 (without the handle 12) or the vehicle body consisting, for example, of the lower section 3, the vertical frame section 14 and an integrated table 18 has in a y-z-side view essentially the shape of a U turned by 90 degrees or the shape of a C. The lower section 3 and the integrated table 18 represent in a y-z-side view each horizontal legs which are connected by the vertical frame section 14, expediently only by the vertical frame section 14.

The lower section 3 and the vertical frame section 14 together (without the handle 12) form an essentially L-shaped structure in a y-z side view.

With the pull-out assembly 150, the transport vehicle 2 (without the handle 12) essentially has the shape of an E in a y-z side view. The lower section 3, the pull-out assembly 150 and the integrated table 18 represent horizontal legs connected by the vertical frame section 14. The pull-out assembly 150 is arranged vertically between the lower section 3 and the integrated table 18.

If the (optional) integrated table 18 is not present, the transport vehicle 2 (without the handle 12) has essentially the shape of an upside down F in a y-z side view. The lower section 3 and the pull-out assembly 150 represent horizontal legs connected by the vertical frame section 14.

The extension of the vertical frame section 14 in z-direction is greater than the extension of the lower section 3 in y-direction and greater than the extension of the integrated table 18 in y-direction. The y-extension of the bottom part 4 corresponds to the y-extension of the integrated table 18 and the y-extension of the pull-out assembly 150 (in retracted position). The vertical frame section 14 preferably occupies at least 60%, in particular at least 70% of the z-extension of the vehicle body or the transport vehicle 2 without the handle 12.

The vertical frame section 14 is located in the rearward section 7 of the transport vehicle 2. Expediently, the integrated table 18 and/or the pull-out assembly 150 is only supported by the vertical frame section 14 located in the rearward section 7.

The vehicle body comprising the lower section 3, the vertical frame section 14 and the integrated table 18 preferably represents a permanently integral structure that remains unchanged when a box-shaped container 80 is removed and/or attached at the container attachment interface 6. No modification of the vehicle body, in particular of the vertical frame section 14 and/or the integrated table 18, is necessary to remove and/or attach the box-shaped container 80 at the container attachment interface 6. The same applies to the removal and/or attachment of the pull-out assembly 150. Expediently, the integrated table 18 and/or the vertical frame section 14 cannot be removed from the vehicle body without the use of tools.

Figure 2:
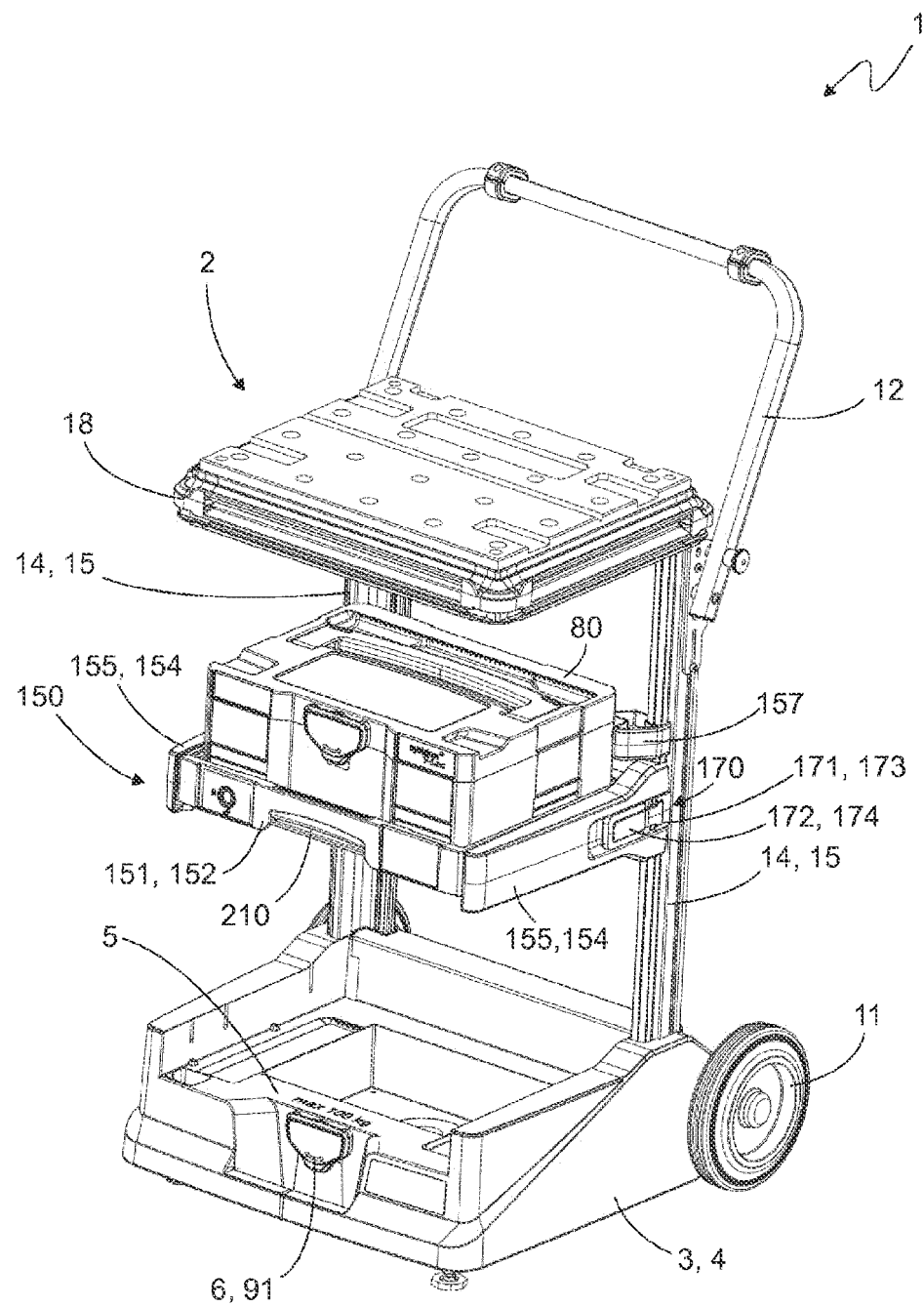
FIG. 2 a transport device with a pull-out assembly and inserted container.

In the following, the pull-out assembly 150 will be discussed in more detail:

The pull-out assembly 150 is equipped with the horizontally extendable container accommodation element 152, into which the first box-shaped container 80 can be inserted from above. A container 80 inserted into the container accommodation element 152 is shown in FIG. 2.

In particular, the first box-shaped container 80 can selectively be attached to the container attachment interface 6 or inserted into the container accommodation element 152 from above. If the box-shaped container 80 is inserted into the container accommodation element 152, the box-shaped container 80 can be pulled out horizontally together with the container accommodation element 152.

Expediently, the container accommodation element 152 is a drawer and/or designed in such a way that the box-shaped container 80 can be inserted without the use of tools and/or at least in vertical direction without being fixed. Accordingly, the container 80 can be inserted into the container accommodation element 152 in an extremely simple and uncomplicated manner, in particular without additional user actuation (e.g. of a fastening device) and/or without having to modify the pull-out assembly and/or the vehicle body for inserting the container.

The pull-out assembly 150 has a basically cuboid, flat basic shape and is oriented horizontally. The pull-out assembly 150 comprises a pull-out unit 151, which comprises a pull-out mechanism 153, in particular a telescopic pull-out, and the container accommodation element 152 attached to the pull-out mechanism 153. The pull-out mechanism 153 is shown in FIG. 3, for example. The pull-out assembly 150 further comprises a support assembly 155 to which the pull-out mechanism 153 is attached. The container accommodation element 152 can be moved horizontally, especially in the y-direction, relative to the support assembly 155 via the pull-out mechanism 153. The support assembly 155 is fixed in the horizontal direction relative to the vertical frame section 14 or the transport vehicle 2.

The container accommodation element 152 can be moved into a retracted and an extended position relative to the support assembly 155, in particular relative to the vertical frame section 14, in particular by a movement in y-direction. FIG. 1 shows the container accommodation element 152 in a retracted position and FIG. 3 shows the container accommodation element 152 in an extended position. As an example, the front side of the container accommodation element 152 is equipped with a handle 210, which can be used to extend it towards the front.

In the retracted position, the container accommodation element 152 takes up the same x-y area as the lower section 3 and/or the integrated table 18. In the extended position, the container accommodation element 152 also takes up an x-y area that is located in front of the lower section 3 and/or the integrated table 18 in the y-direction. In the extended position, the container accommodation element 152 is expediently located with at least half or three quarters of its y-extension in y-direction in front of the lower section 3 and/or the integrated table 18.

As an example, the container accommodation element 152 is designed as a drawer. The container accommodation element 152 is open at the top so that the box-shaped container 80 can be inserted into the container accommodation element 152 from above. Preferably, no user actuation of any fastening device is required for inserting and/or removing the box-shaped container 80 into/from the container accommodation element 152. Expediently, the box-shaped container 80 is simply placed on the accommodation bottom of the container accommodation element 152 without attaching the box-shaped container 80 to the container accommodation element 152. In a state accommodated by the container accommodation element 152, the box-shaped container 80 is thus not fixed or is loose, especially in vertical direction.

The container accommodation element 152 has the accommodation bottom on which the box-shaped container 80 can be placed. Preferably, four peripheral walls extend upwards from the accommodation bottom, which peripheral walls together with the accommodation bottom define a cuboidal, flat accommodation volume. The four peripheral walls laterally stabilize the box-shaped container 80 in the inserted state. The z-extension of the peripheral walls is expediently less than half or less than one third of the z-extension of the box-shaped container 80.

The box-shaped container 80 has on its underside feet, which are arranged especially in the corner areas of the box-shaped container 80. In the accommodation bottom of the container accommodation element 152, one or more recesses are provided to accommodate the feet. As an example, the accommodation bottom of the container accommodation element 152 has two elongate recesses extending in y-direction, which are each located in the respective edge area of the accommodation bottom in x-direction.

Preferably, in a retracted state, expediently in any retracted state, and in an extended state, expediently in any extended state, of the container accommodation element 152, the first box-shaped container 80 is insertable and/or removable from above into the container accommodation element 152. Expediently, the first box-shaped container 80 is accessible in any retracted and/or extended state of the container accommodation element 152, so that e.g. the lid 102 of the container 80 can be opened. The pull-out assembly 150, in particular the support assembly 155, is open at the top so that the container accommodation element 152 and in particular a container 80 inserted into the container accommodation element 152 remains accessible even in the retracted state of the container accommodation element 152.

The support assembly 155 comprises exemplarily two support arms 154 extending horizontally forward from the vertical frame section 14, on which support arms 154 the container accommodation element 152 is mounted slidably by means of the pull-out mechanism 153. The support arms 154 run parallel to each other. The y-extension of the support arms 154 is expediently essentially equal to the y-extension of the container accommodation element 152 in the retracted state.

As explained in detail below, the vertical frame section 14 has two parallel vertical frame elements 15 extending vertically upwards. On each of these vertical frame elements 15, a support arm 154 is disposed.

As can be seen in FIG. 3, the two support arms 154 are connected to each other by two intersecting, elongate stabilizing elements 156, for example. The stabilizing elements 156 preferably run underneath the container accommodation element 152 and expediently span a horizontal plane.

In accordance with a design not shown in the figures, the transport vehicle 2 comprises at least two pull-out assemblies distributed in the vertical direction on the vertical frame section 14. The pull-out assemblies are expediently identical to the discussed pull-out assembly 150 and are preferably arranged one above the other on the vertical frame section 14.

In the following, the attachment mechanism 170 will be discussed, which is expediently part of the pull-out assembly 150. The attachment mechanism 170 can be seen (from outside) e.g. in FIG. 1. Expediently, a corresponding attachment mechanism 170 is provided on each of the two outward facing longitudinal sides of the pull-out assembly 150, e.g. on each outward facing longitudinal side of the support arms 154.

Using the attachment mechanism 170, the pull-out assembly 150 can be fixed to the vertical frame section 14 in the vertical direction without the use of tools. The attachment mechanism 170 is designed to fix the pull-out assembly 150 vertically by clamping it to the vertical frame section 14. The vertical fixing is preferably done exclusively by frictional connection.

The attachment mechanism 170 is designed in such a way that the vertical fixation can be released by user actuation. Once the vertical fixation is released, the pull-out assembly 150 can be positioned vertically steplessly relative to the vertical frame section 14 in a state attached to the vertical frame section 14. The pull-out assembly 150 can be moved steplessly (i.e. continuously) along the vertical frame section 14, in particular the two vertical frame elements 15, like on rails (in the vertical direction) and fixed vertically at the desired position by clamping with the attachment mechanism 170. The stepless positioning is preferably possible over the entire z-extension of the vertical frame section 14.

Expediently, via the attachment mechanism 170, the pull-out assembly 150 is removable and/or attachable from and/or to the vertical frame section 14 without the use of tools. Expediently, the pull-out assembly 150 is attached to the vertical frame section 14 in horizontal direction, especially in y-direction and/or x-direction, by means of a form fit. Expediently, this attachment, in particular this form fit, can be released by actuating the attachment mechanism 170.

The attachment mechanism 170 has a first operating device 171 for removing/attaching the pull-out assembly 150 from/to the vertical frame section 14 without the use of tools and a second operating device 172 for fixing the pull-out assembly 150 vertically to the vertical frame section 14 without the use of tools. The first operating device 171 can be operated in particular via a first operating element 173 and the second operating device 172 via a second operating element 174. The first operating element 173 and/or the second operating element 174 are preferably designed in the form of a flap. The first operating element 173 and/or the second operating element 174 are preferably pivotably mounted and can preferably be pivoted to actuate the respectively associated operating device 171, 172. The second operating element 174 is preferably mounted pivotably to the first operating element 173. Preferably, each support arm 154 is equipped with a corresponding first operating element 173 and a corresponding second operating element 174.

As shown in FIGS. 7 and 8, the first operating element 173 includes an attachment section 181 which, by pivoting the first operating element 173, can be brought into engagement with a contact surface 191 provided on the vertical frame section 14 in order to attach the pull-out assembly 150 to the vertical frame section 14. Exemplary details in this regard are explained below.

The first operating element 173 is coupled to the second operating element 174 via an excentric structure 187, so that when the second operating element 174 is pivoted, the attachment section 181, which rests on the contact surface 191, is pulled in the direction towards the contact surface 191, so that the pull-out assembly 150 is clamped to the vertical frame section 14 and thus fixed vertically. Exemplary details in this regard are explained below.

The attachment mechanism 170 has a third operating element 178 for setting the strength of the vertical fixing of the pull-out assembly 150 to the vertical frame section 14. The third operating element 178 includes a knurled nut 178.

In the following, with reference to FIGS. 5 to 9, an exemplary design of the attachment mechanism 170 will be discussed.

Figure 5:
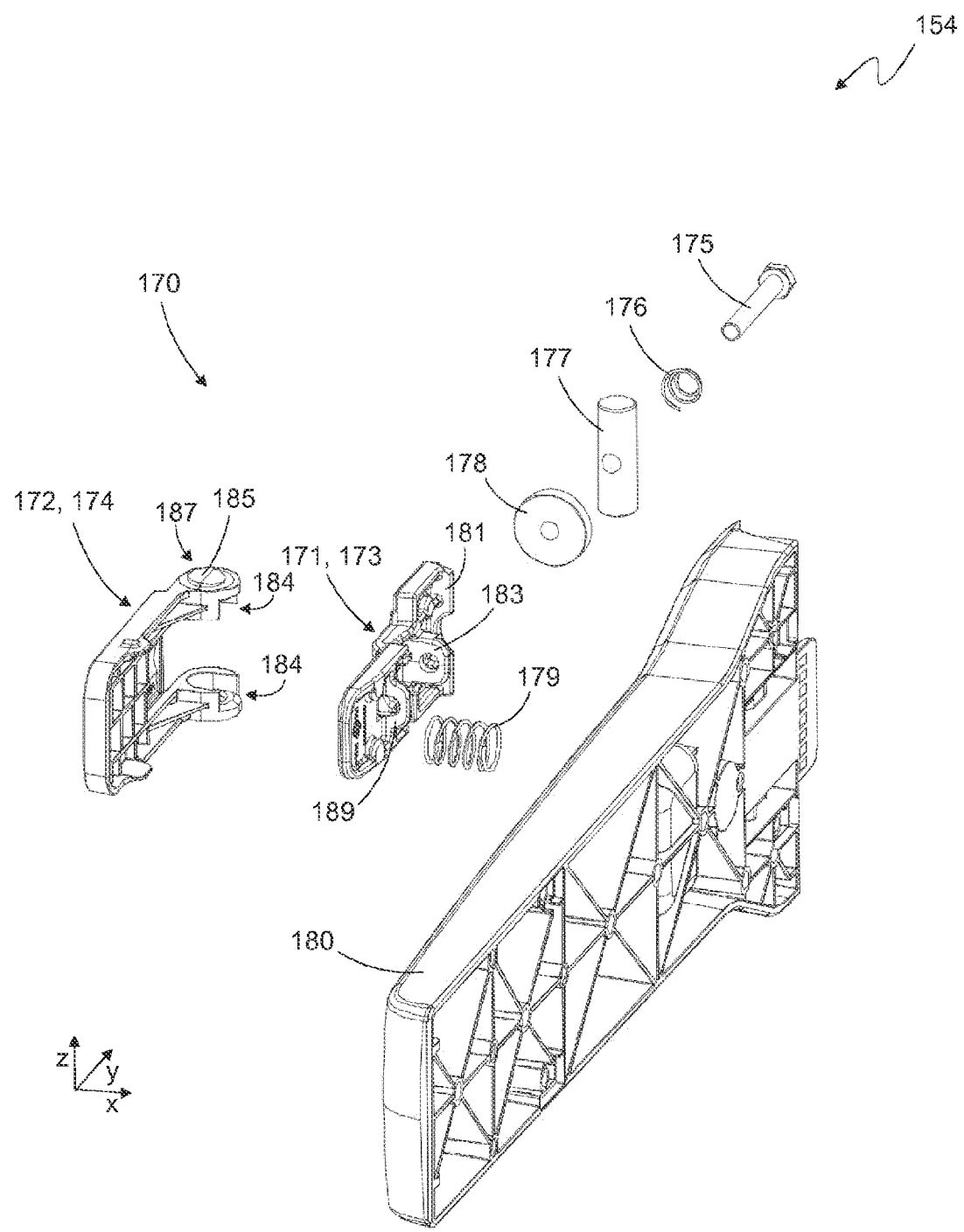
FIG. 5 an exploded view of components of an attachment mechanism.
Figure 6:
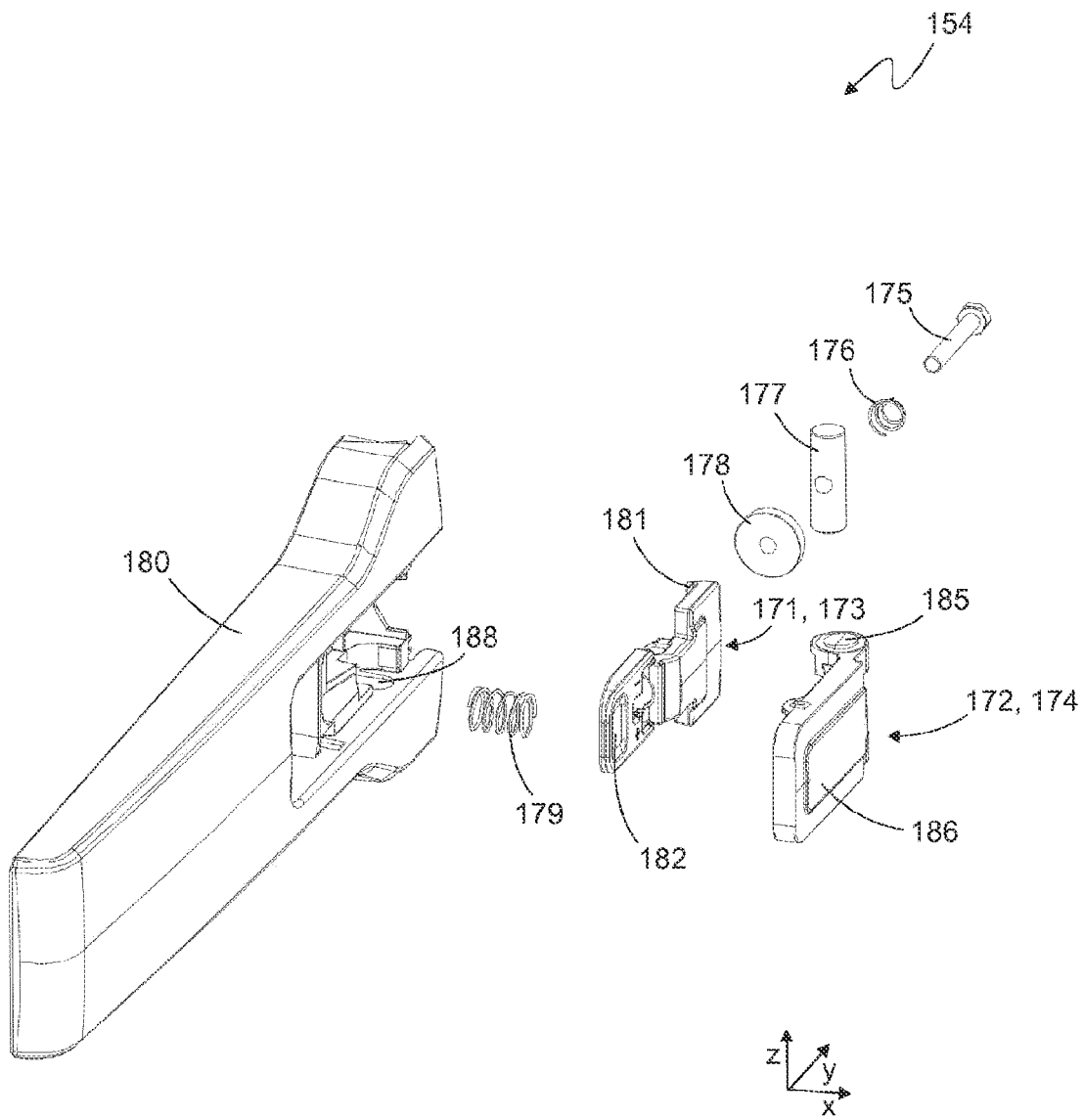
FIG. 6 another exploded view of components of the attachment mechanism.

FIG. 5 shows an exploded view of components of an attachment mechanism 170 located on the left side of the pull-out assembly 150 and FIG. 6 shows an exploded view of components of an attachment mechanism located on the right side of the pull-out assembly 150. The two attachment mechanisms shown in FIGS. 5 and 6 are expediently identical and/or mirror-symmetrical to a y-z plane, so that the following explanations apply to both attachment mechanisms.

FIG. 5 shows in particular an elongate support arm body 180, which together with the attachment mechanism 170 forms a support arm 154. The elongate support arm body 180 is injection molded.

FIG. 6 shows the outside of a support arm body 180. The support arm body 180 has a recess at its end proximal to the vertical frame section 14 to accommodate the attachment mechanism 170.

The attachment mechanism 170 includes the first operating element 173, which is exemplarily designed in the form of a flap. As shown in FIG. 5, the first operating element 173 has an elongate base section extending in the y-direction, from which two spaced coupling sections 183, 189, project in the x-direction. Each coupling section 183, 189 has a hole.

Figure 9:
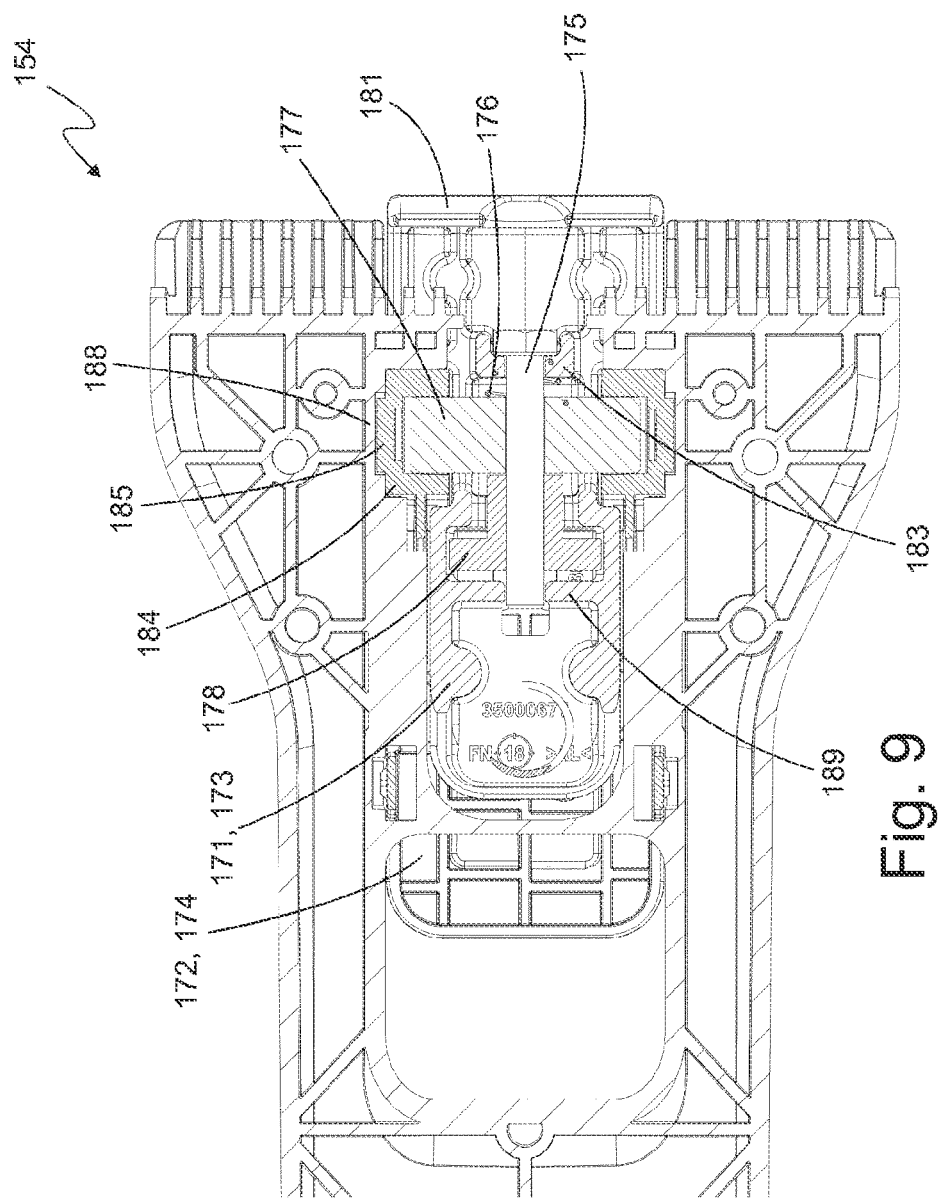
FIG. 9 another sectional view of the attachment mechanism.

FIG. 9 shows an x-y section through a support arm 154, which includes an attachment mechanism 170 in a mounted state. Between the two coupling sections 183, 189, from the first coupling section 183 to the second coupling section 189, there is a first spring 176, a bolt 177 and the knurled nut 178. A screw 175 runs through the first coupling section 183, the first spring 176, the bolt 177, the knurled nut 178 and the second coupling section 189. A thread is provided in the knurled nut 178 into which the screw 175 is screwed. The bolt 177 runs crosswise to the screw 175.

FIG. 5 further shows the second operating element 174, which is exemplarily flap-shaped. The second operating element 174 has a base section extending in the y-direction, from which a coupling structure 187 protrudes at a distal end, which coupling structure 187 is especially designed as an excentric structure. The coupling structure 187 comprises exemplarily two essentially cylindrical structure sections, which are arranged coaxially to each other and have pivot bearing sections 185 on the outside, which are exemplarily designed as circular elevations. On the inside of the structural sections, bolt receiving sections 184 are arranged into which the bolt 177 can be inserted. Expediently, the bolt 177 is engaged in the bolt-receiving sections 184 in the assembled state. Preferably, the second operating element 174 is pivotably mounted at the first operating element 173 via the bolt 177 and the screw 175.

With the pivot bearing sections 185, the second operating element 174 (with attached first operating element 173 as well as the above mentioned components 175 to 178) is insertable into the recess provided on the support arm body 180, especially at pivot bearing mounting sections 188. A second spring 179 is expediently located between an actuation section 182 located at the distal end of the first operating element 173 and the support arm body 180.

FIG. 9 shows how the pivot bearing sections 185 are inserted into the pivot bearing mounting sections 188. In this state, the second operating element 174 is mounted on the pull-out assembly 150, in particular the support arm body 180, so that it can be pivoted about a pivot axis defined by the pivot bearing sections 185 and running in z direction.

With reference to FIGS. 7 and 8, it shall be explained in the following how the exemplary attachment mechanism 170 works. FIGS. 7 and 8 show x-y sectional views of the attachment mechanism 170, showing the attachment mechanism 170 located on the right-hand longitudinal side of the pull-out assembly 150. Expediently, the attachment mechanism 170 (if present) located on the left-hand longitudinal side of the pull-out assembly 150 is operated accordingly.

The attachment mechanism 170 can be set to three different states: a first state in which the first operating device 171 and the second operating device 172 are not actuated, a second state in which the first operating device 171 is actuated and the second operating device 172 is not actuated, and a third state in which the first operating device 171 is actuated and the second operating device 172 is not actuated. Expediently, the second operating device 172 in its actuated position covers the actuation section 182 of the first operating device 171 so that the first operating device 171 cannot be actuated in this state.

The first operating device 171 is actuated by pressing the actuation section 182 inwards in the x-direction, e.g. by the finger of a user. The actuation section 182 is expediently located on the outside of the first operating element 173, at the distal end facing away from the attachment section 181. By actuating the actuation section 182, the first operating element 173 is pivoted about an axis of rotation parallel to the z-direction. When the actuation section 182 is released, the first operating element 173 is automatically pivoted back due to the second spring 179 and assumes its unactuated position. FIG. 7 shows the first operating element 173 in its actuated position and FIG. 8 shows it in its unactuated position.

In the unactuated position of the second operating device 172, the second operating element 174 is pivoted about an axis of rotation parallel to the z direction and projects outward, especially in an x-y direction. This position shall be referred to as the unactuated position and is shown e.g. in FIG. 7. The outwardly projecting section shall also be referred to as actuation section 186. By user actuation, the second operating element 174 can be pivoted around its axis of rotation so that it rests against the outer longitudinal side of the pull-out assembly 150, especially the support arm 154, and assumes the actuated position shown e.g. in FIG. 8.

This position of the second operating element 174 is stable, so that a further user actuation of the actuation section 186 is required to move the second operating element 174 back to the unactuated position. Expediently, the operating element 174 passes a dead point between the actuated and non-actuated position.

As shown in FIG. 7, the pull-out assembly 150, in particular the support arm body 180, contacts, with a first, in particular transverse, contact surface 194 and a second, in particular longitudinal, contact surface 195 a corresponding first, in particular transverse, contact surface 192 of the vertical frame element 15 and a second, in particular longitudinal, contact surface 193 of the vertical frame element 15. The contact surfaces 192, 193 are located on the inside of the vertical frame element 15. On the outside, the vertical frame element 15 has the contact surface 191, which shall also be referred to as the third contact surface 191. The third contact surface 191 is exemplarily part of a groove 190, in particular a U-groove, which is preferably arranged on the outside of the vertical frame element 15.

The above-mentioned contact surfaces 191, 192, 193 extend expediently over at least half, preferably over the entire z-extension of the vertical frame section 14.

The first operating element 173 has the exemplary hook-shaped attachment section 181 which, as shown in FIG. 8, engages with the third contact surface 191 (by engaging in the groove 190) when the first operating device 171 is in the non-actuated state, and thus the pull-out assembly 150 is attached to the vertical frame section 14 by positive locking. As shown in FIG. 7, the engagement of the attachment section 181 can be released by actuating the first operating element 173 so that the pull-out assembly 150 is no longer attached to the vertical frame section 14, especially in the y-direction, and can be completely removed from the vertical frame section 14 in this direction.

To reattach the pull-out assembly 150 to the vertical frame section 14, the first operating element 173 must be actuated again so that the attachment section 181 can engage in the vertical frame element 15.

If the pull-out assembly 150 is attached to or suspended in the vertical frame section 14, the second operating element 174 has to be actuated to fix the pull-out unit 150 vertically. Due to the excentric structure 187, pivoting the second operating element 174 pulls the first operating element 173 with its attachment section 181 against the third contact surface 191 so that between the attachment section 181 and the first contact surface 194 a clamping of the vertical frame section 14 takes place. The pull-out assembly 150 is thus clamped to the vertical frame section 14 and can no longer be moved in the z-direction on the vertical frame section 14. The strength or clamping force of the fixing can be adjusted via a third operating element, in particular the knurled nut 178, which can be used to position the first operating element 173—and thus the attachment section 181—relative to the support arm body 180—and thus to the contact surface 194.

As can be seen in FIGS. 1 and 2, fixing elements 157 can be arranged on the vertical frame section 14 above the pull-out assembly 150, which serve to horizontally stabilize an inserted container 80. In particular, the fixing elements 157 can be moved vertically and/or have corner-shaped recesses to accommodate the rear corner areas of the container 80.

In the following, the container attachment interface 6 present at the lower section 3 will be discussed in more detail.

The container attachment interface 6 serve to attach the box-shaped container 80 to the lower section 3 of the transport vehicle 2, preferably in such a way that the box-shaped container 80 is fixed in all spatial directions. Expediently, the container attachment interface 6 is designed in such a way that the container 80 can be attached to and/or detached from the container attachment interface 6 without the use of tools.

As an example, the container attachment interface 6 comprises a movable coupling element 91, which can be moved by user actuation selectively into a locking position or a release position. In the locking position, the coupling element 91 engages with a first non-movable coupling structure arranged on the box-shaped container 80. In the release position, the coupling element 91 releases the first non-movable coupling structure so that the box-shaped container 80 can be removed from the bottom part 4.

The movable coupling element 91 is exemplarily designed as a rotating bolt, especially as a T-shaped rotating bolt. Preferably, the movable coupling element 91 is a rigid body that is movably attached to the lower section 3. The movable coupling element 91 can be manually moved into different rotation positions in order to selectively establish or release the attachment of the container 80 to the transport vehicle 2.

The movable coupling element 91 is exemplarily arranged at the front 10 of the lower section 3 and is preferably rotatably mounted, especially around a y-axis of rotation. The movable coupling element 91 is expediently located in a recess on the front 10.

The container attachment interface 6 preferably further comprises a non-moving coupling structure 92, exemplarily formed as recesses arranged in the storage surface 5. For example, the non-moving coupling structure 92 comprises two elongate recesses arranged in the area of the longitudinal sides 9, which recesses extend in the y-direction. The non-movable coupling structure 92 can be engaged with lower container couplers 82, which are explained below.

Preferably, the container attachment interface 6 and/or the container 80 is designed in such a way that, in a state fixed to the transport vehicle 2, the container 80 is attached to the transport vehicle 2 with its bottom and front side, in particular only with its bottom and front side.

In the following, the box-shaped container 80 will be explained in more detail, especially with reference to FIG. 4. For better visibility, the pull-out assembly 150 is not shown in FIG. 4.

The container 80 has a cuboid basic shape. For example, the container 80 has a lower part 101 and a lid 102 which is placed on the lower part 101. The lid 102 is hinged to the lower part 101, especially to its rear side. Preferably the lower part 101 and the lid 102 have the same horizontal outer contour. On the upper side of the container 80, a carrying handle 103 is provided as an example, which can be folded out in particular. The carrying handle 103 is purely optional and can also be omitted.

Figure 15:
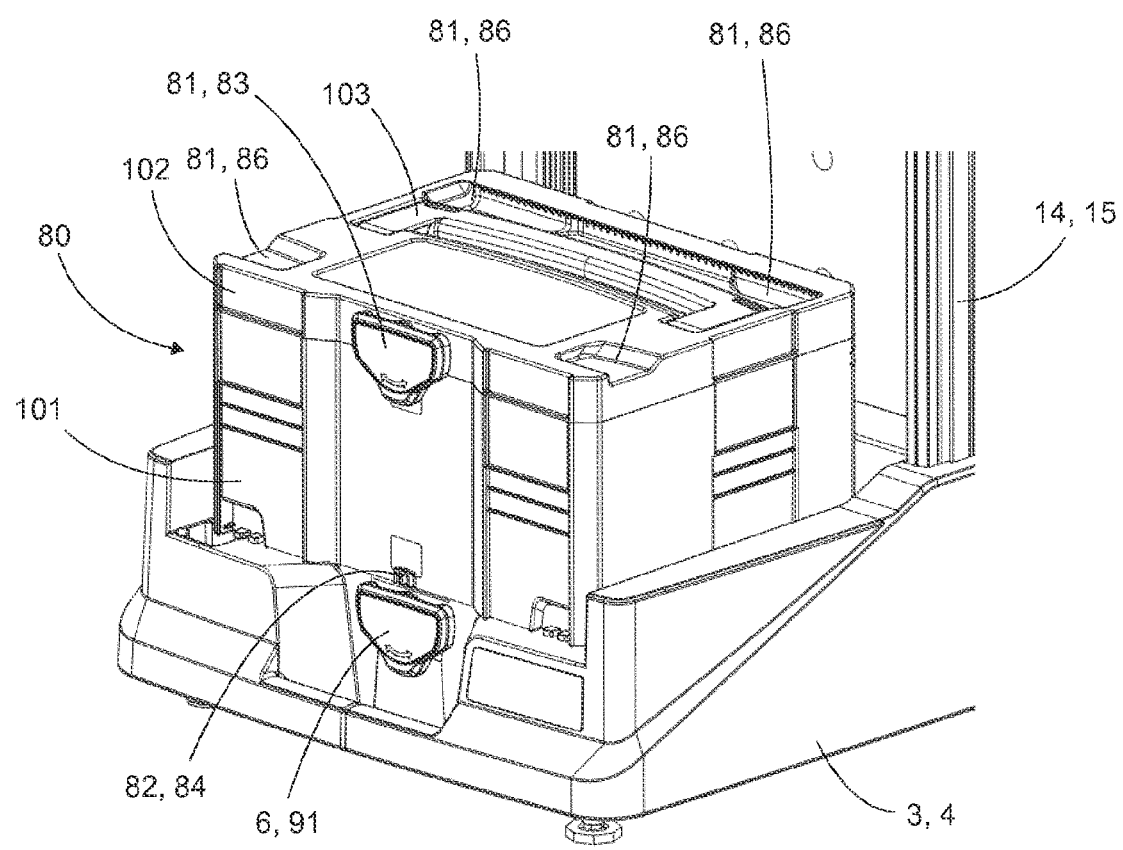

The container 80 has upper container couplers 81 and lower container couplers 82, which can be seen especially in FIGS. 13 to 15. As an example, the upper container couplers 81 are designed to correspond to the lower container couplers 82, so that a further container 80 equipped with identical container couplers can be placed on the present container 80 and the lower container couplers 82 can be used to attach the further container 80 to the upper container couplers 81 of the present container 80, in particular in such a way that the two containers 80 are fixed in all spatial directions with respect to each other and form a stable vertical stack 90.

The lower container couplers 82 comprise in particular a first non-movable coupling structure 84, for example a coupling projection which can be engaged with the movable coupling element 91. The non-movable coupling structure 84 is located in particular at the front of the container 80.

The lower container couplers 82 further includes a second non-movable coupling structure 85, such as feet, that can engage with the non-movable coupling structure 92 and are located on the underside of the container 80.

FIG. 14 shows a vertical sectional view through the box-shaped container 80 in a state in which its second non-moving coupling structure 85, designed as feet, engages with the non-moving coupling structure 92 of the container interface 6. As an example, the non-movable coupling structure 92 has a projection which is engaged behind by the feet, in particular the rear feet, expediently only the rear feet.

The upper container couplers 81 expediently comprise a movable coupling element 83, exemplarily a rotary bolt, in particular a T-shaped rotary bolt, which is expediently designed in correspondence to the movable coupling element 91. The movable coupling element 83 can be brought into engagement in particular with the first non-movable coupling structure 84 of a further container 80. Furthermore, the movable coupling element 83 can be used to lock the lid 102.

The upper container couplers 81 further preferably include a third non-moving coupling structure 86, which may expediently be brought into engagement with the second non-moving coupling structure 85 of a further container 80. The third non-moving coupling structure 86 preferably comprises one or more recesses and is located at the top of container 80.

The container 80 is designed in particular in such a way that in a state fixed to a further container 80, the (present) container 80 is attached to the further container 80 with its bottom and front side, in particular only with its bottom and front side.

The containers 80 described above may, for example, be designed in accordance with the containers described in EP2315701B1.

As an example, in FIG. 4, a vertical stack 90, comprising two box-shaped containers 80 stacked and coupled together, is placed on the storage surface 5 and attached to the lower section 3 by the container attachment interface 6. Expediently, the stack 90 is fastened to the lower section 3 only, in particular to the bottom part 4 only.

The lower container 80 placed in FIG. 4 on the storage surface 5 shall be referred to here as the first container 80 and the upper container 80 as the second container 80. If the pull-out assembly 150 discussed above, shown as an example in FIGS. 1 to 3, is present on the vertical frame section 14 of the transport vehicle 2 in FIG. 4, the second container 80 can, in a state removed from the first container 80, either be placed on the first container 80 and attached to it or inserted into the container accommodation element 152 of the pull-out assembly 150.

In the following, the lower section 3 will be discussed in more detail:

The lower section 3 expediently comprises a bottom part 4. Expediently, the bottom part 4 forms the lower section 3. The bottom part 4 has an essentially cuboid, in particular flat basic shape. The y-extension and the x-extension of the bottom part 4 are each at least twice as large as the z-extension of the bottom part 4.

From the top of the bottom part 4, the vertical frame section 14 extends upwards. The storage surface 5 is arranged on the top of the bottom part 4. Furthermore, the container attachment interface 6 is located at the bottom part 4, especially exclusively at the bottom part 4.

The bottom part 4 comprises, for example, a preferably one-piece bottom part body manufactured as an injection molded part, which provides the storage surface 5.

The bottom part 4 preferably has a pull-out attachment interface 137 to which the pull-out unit 151 (in a state removed from the support assembly 155) can be attached, in particular via the pull-out mechanism 153. The pull-out attachment interface 137 is shown in FIG. 3.

The pull-out unit 151 can also be provided without the support assembly 155 and/or in addition to the pull-out assembly 150 and can be attached directly to the pull-out attachment interface 137, so that a pull-out container accommodation element 152 is provided directly at the bottom part 4. In this state, the storage surface 5 is covered by the pull-out unit 151 and can no longer be used for depositing the box-shaped container 80.

The pull-out attachment interface 137 is exemplarily arranged on the inner sides of the legs of a U-shaped elevation of the bottom part 4. The U-shaped elevation is designed in such a way that the pull-out unit 151 fits into the space provided between the legs of the U-shaped elevation. Expediently, the pull-out attachment interface 137 includes at least one, in particular three holes on each inner side with which the pull-out unit 151 can be attached to the bottom part 4 by means of screw connections.

In the following, the vertical frame section 14 and the integrated table 18 will be discussed:

The vertical frame section 14 spans an x-z-plane. As an example, the vertical frame section 14 comprises two elongate, parallel vertical frame elements 15 extending vertically upwards from the bottom part 4. Preferably, the vertical frame section 14 consists of the two frame elements 15.

The two vertical frame elements 15 each occupy the same y and z range and are offset from each other in the x direction. The vertical frame elements 15 are arranged in the y-direction near the rear side 8, i.e. in the rearward section 7, and are located in the x-direction in the area of the longitudinal sides 9. The two vertical frame elements 15 are attached to the upper side of the bottom part 4 and extend vertically upwards.

The vertical frame elements 15 are exemplarily designed as profiles, especially as metal profiles.

Expediently, a position scale is provided on the vertical frame section 14, in particular on the frame elements 15, which position scale comprises, for example, a plurality of horizontal lines.

The table 18 integrated in the vehicle body follows the vertical frame section 14 in the z-direction. The integrated table 18 represents the vertical upper end of the vehicle body—i.e. in particular of the transport vehicle 2 without the handle 12. The integrated table 18 represents the vertical highest point of the vehicle 2 without handle 12. The integrated table 18 is optional. Instead of the integrated table 18, for example, there could also be a stiffening element between the two vertical frame elements 15.

The integrated table 18 has four elongate, horizontal frame elements 17A, 17B. The horizontal frame elements 17A, 17B are exemplarily designed as profiles, especially as metal profiles. The frame elements 17 together form a horizontal frame section in the form of a rectangular frame on which the table top 19 of the integrated table 18 is arranged, in particular placed. The integrated table 18 occupies essentially the same x-y area as the bottom part 4. The integrated table 18 has a cuboid, especially flat basic shape.

The horizontal frame section defines an x-y plane orthogonal to the x-z plane defined by the vertical frame section 14. The horizontal frame section is attached to the upper end of the vertical frame section 14, for example to the two vertical frame elements 15. The integrated table 18 is attached to the vertical frame elements 15, in particular with its two rear corner sections.

Preferably, the integrated table 18 has a support section 27, on which the worktable 40, which is explained in more detail below, can be supported in a horizontal orientation with an attachment element 41 attached to the front of the working table 40 in order to assume a stable working position.

The support section 27 can be seen in FIG. 4, for example, and is present on one, several or all horizontal frame elements 17A, 17B. The support section 27 includes a groove, especially a V-groove, in which the attachment element 41 can engage. The groove is preferably open at the top so that the attachment element 41 can engage in the groove from above. Expediently, the groove extends over the entire length of the horizontal frame element 17A, 17B.

In the following, possible configurations of the transport device 1 will be discussed.

Figure 12:
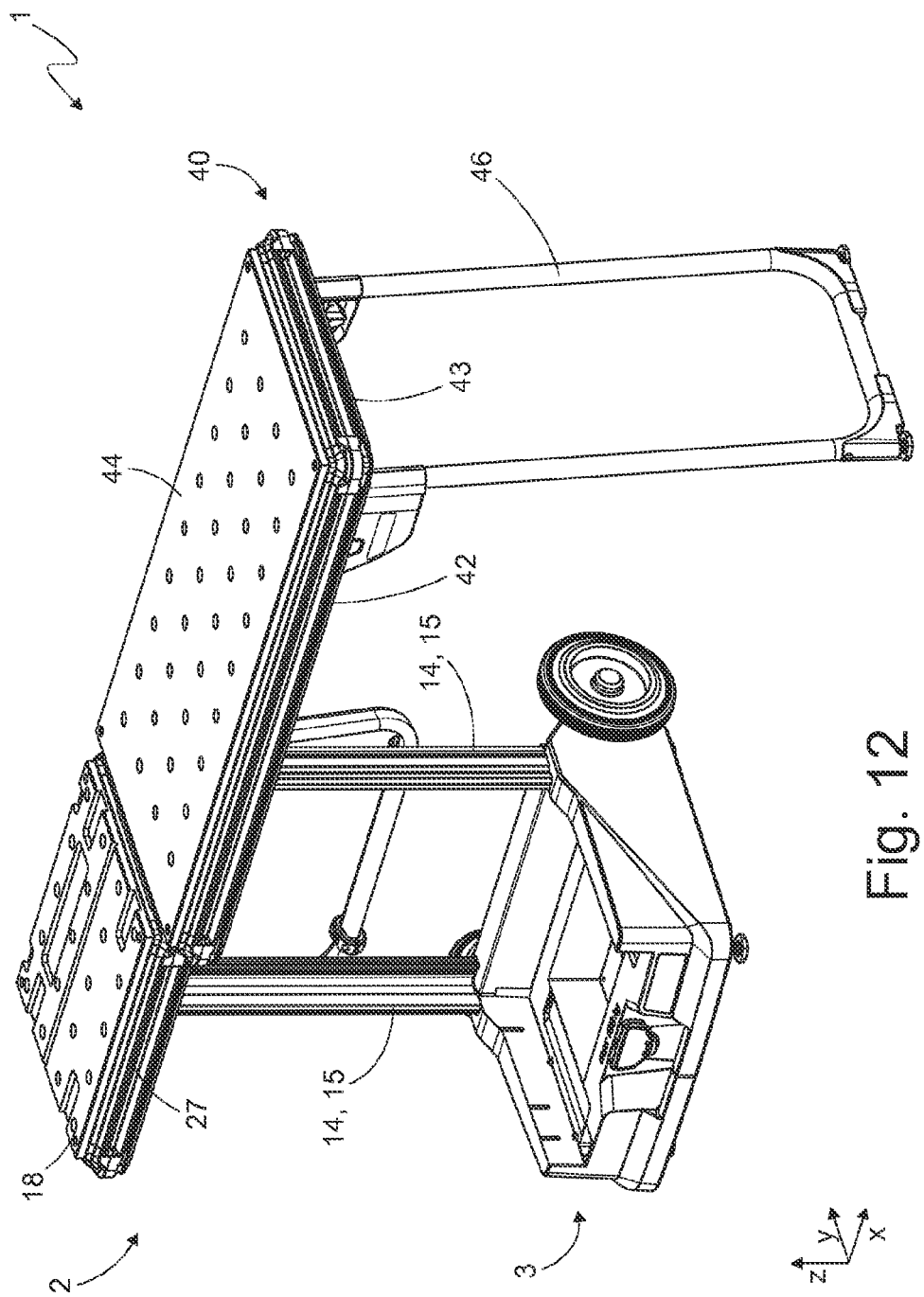
FIG. 12 the transport device in a working configuration.

Transport device 1, equipped with the elongate worktable 40 described below, may expediently assume at least two different configurations: a transport configuration in which the worktable 40 is attached in vertical orientation to the transport vehicle 2 as shown in FIG. 4, and a working configuration in which the worktable is attached in horizontal orientation to the integrated table 18 as shown in FIG. 12.

In the transport configuration, the worktable 40 (and/or the box-shaped container 80) is fixedly attached to the transport vehicle 2, so that, even in a driving position in which the transport device 1 is tilted with respect to the floor 30, the worktable 40 (and/or the box-shaped container 80) is stably attached to the transport vehicle 2 and can be transported by the transport vehicle 2. All containers 80 are fixed to the container attachment interface 6 in the transport configuration (preferably as vertical stack 90).

Expediently, the elongate worktable 40 can be removed completely from the transport vehicle, in particular without the use of tools.

The elongate worktable 40 can be attached to the transport vehicle 2 without the use of tools in a vertical orientation in the rearward section 7 by means of a worktable attachment interface 24 explained below, in order to assume a transport position in which the elongate worktable 40 can be transported by the transport vehicle 2.

As shown in FIG. 1, in the transport position the worktable 40 is aligned with its longitudinal axis vertically—i.e. in z-direction. In the transport position, the table plane of the worktable 40 is aligned parallel to an x-z plane. The x-extension of the worktable 40 corresponds to the x-extension of the vertical frame section 14. In the transport position, the worktable 40 rests against the vertical frame section 14 and occupies the same x-area as the vertical frame section 14. In the z-direction, the worktable 40 in the transport position extends upwards from the bottom part 4 and preferably projects above the transport vehicle 2, in particular the integrated table 18 and/or the handle 12.

In the transport position, the worktable 40 is arranged behind the vertical frame section 14 in the rearward direction—i.e. in the y direction towards the rear side 8. In the y-direction, in the transport position, the worktable 40 is located on the side of the vertical frame section 14 facing the rear side 8. The storage surface 5 is located on the other side—i.e. on the side of the vertical frame section 14 facing the front side 10.

In the transport configuration, the pull-out assembly 150 (not shown in FIG. 4) is preferably attached to the vertical frame section 14. Expediently, no container 80 is inserted in the container accommodation element 152.

FIG. 12 shows the transport device 1 in a working configuration. In the working configuration, the worktable 40 is removed from the worktable attachment interface 24. Furthermore, the worktable 40 is in a horizontal orientation; i.e., its table plane is parallel to an x-y plane. The position of the worktable 40 shown in FIG. 12 can also be referred to as the stationary working position. In the working position, the working table 40 is supported at one of its front sides by the transport vehicle 2, in particular by the integrated table 18. On the front side facing away from the transport vehicle 2, the working table 40 is supported by a table leg arrangement 46 which is explained in more detail below.

In the working configuration, the attachment element 41, which is explained below, engages in the groove of the support section 27 with its attachment arrangement 48, in particular with the attachment projections 53. In the working configuration, the worktable 40 can be removed from the transport vehicle 2 without the use of tools.

Expediently, a respective support section 27 is provided on the front 10, the two longitudinal sides 9 and/or the rear 8 of the transport vehicle 2, in particular the integrated table 18, on which support section 27 the worktable 40 can be supported. The worktable 40 can therefore be selectively attached to the front side 10, a first longitudinal side 9, a second longitudinal side 9 and/or the rear side 8.

In the working configuration, the 150 pull-out assembly (not shown in FIG. 12) is preferably attached to the vertical frame section 14. Expediently, a container 80 is detached from the container attachment interface 6 or a vertical stack 90 and is inserted into the container accommodation element 152.

Next, the worktable attachment interface 24 will be discussed in more detail.

The worktable attachment interface 24 serves to attach the worktable 40 to the transport vehicle 2 in such a way that the worktable 40 can be stably transported by the transport vehicle 2. Preferably, the worktable attachment interface 24 is designed in such a way that the worktable 40, when mounted, is fixed in all spatial directions relative to the transport vehicle 2. It should be noted that the worktable 40 and/or the worktable attachment interface 24 are purely optional features.

Figure 10:
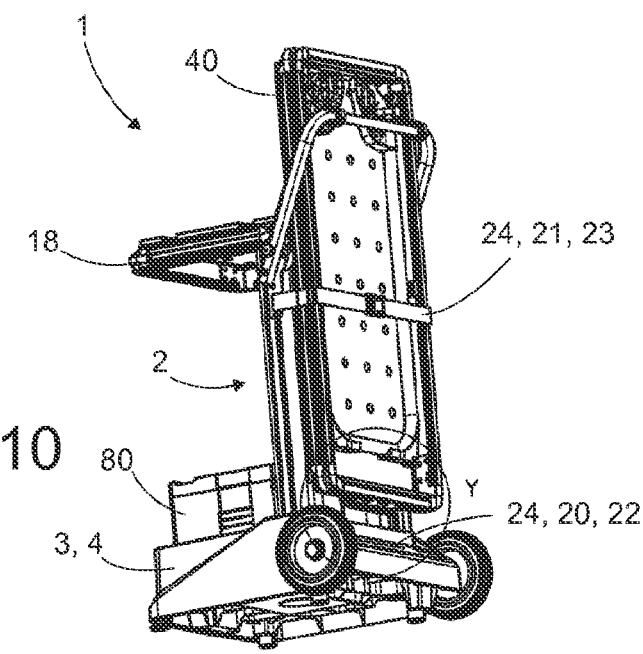
FIG. 10 a rear view of the transport device with attached worktable.

The worktable attachment interface 24 includes the first attachment device 20 and a attachment device 21. The two attachment devices 20, 21 are shown in FIG. 10, for example.

The first attachment device 20 is designed in such a way that the worktable 40 with the attachment element 41 can be mounted to the first attachment device 20 in a tilted orientation relative to the vertical frame section 14 and a vertical fixing to the first attachment device 20 is achieved by pivoting the worktable 40 towards the vertical frame section 14. With the second attachment device 21, the worktable 40 can then be fixed horizontally, in particular to the vertical frame section 14.

To remove the worktable 40, it is necessary to release the second attachment device 21 and pivot the worktable 40 away from the frame section 14 so that it is tilted relative to the vertical frame section 14. The worktable 40 can then be removed from the transport vehicle 2 by a linear movement in y-z direction.

In the following, the first attachment device 20 provided on the bottom part will be discussed. The first attachment device 20 is shown in FIGS. 10 and 11.

The first attachment device 20 comprises a slot 20 and a attachment structure 29 accessible through the slot 20, which attachment structure 29 can be engaged with an attachment element 41 of the worktable 40 to secure the worktable 40 to the worktable attachment interface 24. The first attachment device 20 is located in rearward direction behind the vertical frame section 14.

The attachment arrangement 48 and the slot 22 are preferably designed in such a way that the attachment arrangement 48 can only be inserted into the slot 22 in the above-mentioned tilted position of the worktable 40.

Figure 11:
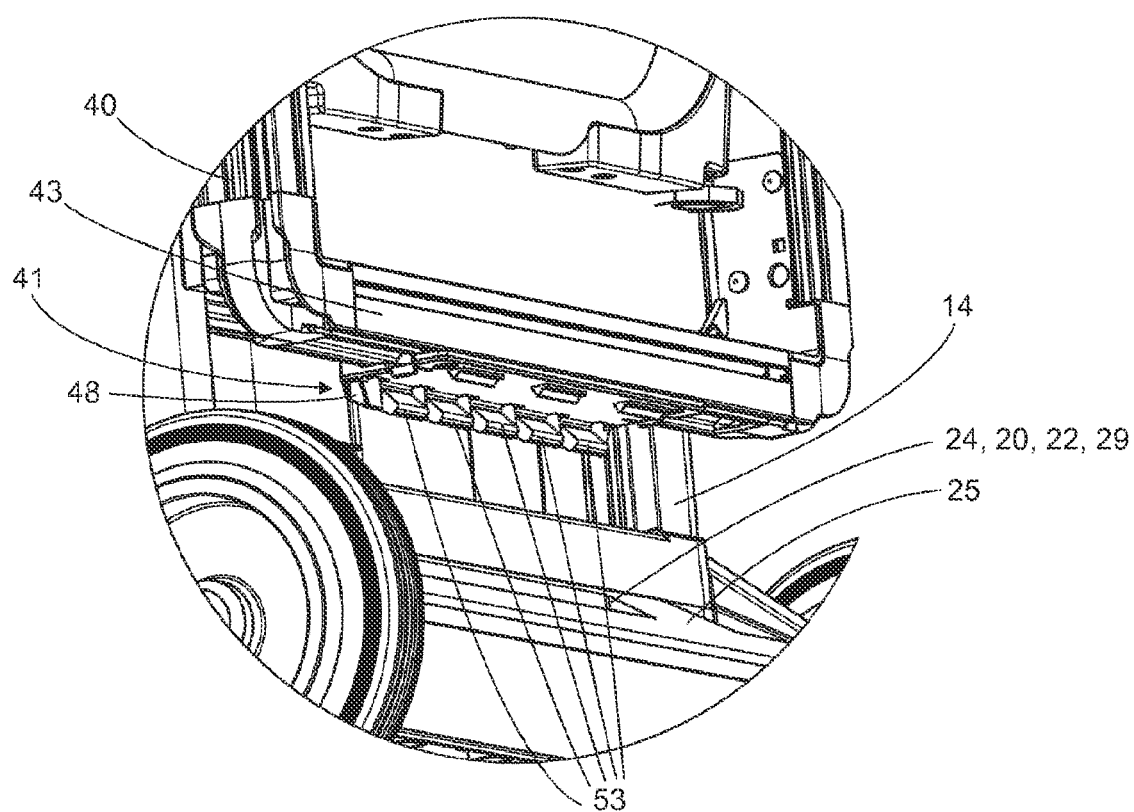
FIG. 11 a detailed view of an attachment element of the worktable.

FIG. 11 shows the area marked "Y" in FIG. 10 in detail. For better visibility, the worktable 40 is shown in FIGS. 10 and 11 in a position where the attachment element 41 is not inserted into the slot 22. If the worktable 40 is correctly attached to the transport vehicle 2, the attachment element 41 is inserted into the slot 22.

As shown in FIG. 11, the slot 22 extends in the x-direction and is located in the y-direction immediately behind the vertical frame section 14. The slot 22 is located on an angled top section 25. The normal vector of the angled top section 25 points especially in a y-z direction. FIG. 10 also shows the attachment element 41, which has an especially hook-shaped attachment arrangement 48 with several L-shaped attachment projections 53, for example. The attachment structure 29 is designed in such a way that it can be engaged with the attachment arrangement 48, in particular the attachment projections 53, so that the worktable 40 is fixed to the bottom part 4 at least in one linear direction, in particular the vertical direction. The attachment structure 29 comprises, for example, a attachment surface (not shown in the figures) which is engaged behind by the attachment arrangement 48.

In the following, an exemplary design of the second attachment device 21 will be discussed in detail:

The second attachment device 21 is arranged on the vertical frame section 14, exemplarily in the upper area of the vertical frame section 14. The second attachment device 21 comprises a belt 23, with which the worktable can be fixed in horizontal direction to the vertical frame section 14 in the transport position. The belt 23 is mounted at two anchorage points as an example. The two anchorage points are at the same height. For example, the belt 23 is laid crosswise around the worktable 40 in the transport position. In this position, the belt 23 has a U-shaped course in an x-y view. The belt 23 has a locking element 28 with which the belt can be opened to release or receive the worktable 40 and closed to secure the worktable 40. As an example, the locking element 28 is arranged in the x-direction in the center of the belt 23.

In the following, the handle 12 will be explained in more detail:

The handle 12 is expediently bow-shaped, especially U-shaped. The handle 12 has two outer sections 36, with which the handle is attached to the vertical frame section 14 in a pivoting manner. The two outer sections 36 are connected by a central section 37 running in the x-direction.

The transport vehicle 2 is equipped with a positioning mechanism 26 with which the handle 12 can be positioned and fixed in at least two different swivel positions. As an example, the handle 12 can be fixed in three different swivel positions by the positioning mechanism.

In the following, the worktable 40 shall be discussed in more detail, especially with reference to FIG. 12.

The worktable 40 has an elongate, especially rectangular basic shape. Expediently, the worktable 40 is at least 1.5 times, especially twice as long as it is wide. The worktable 40 has a frame-shaped worktable frame, which includes longitudinal worktable frame elements 42 and transverse worktable frame elements 43. The longitudinal worktable frame elements 42 and the transverse worktable frame elements 43 are expediently bar-shaped and designed in particular as profiles, preferably as metal profiles. A table top 44 is mounted on the frame-shaped worktable frame.

The worktable 40 has the fold-out table leg arrangement 46, which is exemplary U-shaped. The vertical sections of the table leg arrangement 46 (when folded out) shall also be referred to as table legs. The table leg arrangement 46 is expediently located at the bottom of the worktable 40, preferably in the area of one front side of the worktable 40.

The invention claimed is:

1. A transport vehicle comprising:
a vehicle body having a lower section and a vertical frame section extending upwards from the lower section, the lower section having a storage surface and a container attachment interface for attaching a box-shaped container to the lower section in a state in which the box-shaped container is placed on the storage surface;
a handle arranged on the vehicle body for moving the transport vehicle into a tilted position; and
two wheels arranged on the lower section for supporting the transport vehicle in the tilted position relative to a floor and moving the transport vehicle relative to the floor,
wherein the transport vehicle has, above the container attachment interface, a pull-out assembly disposed on the vertical frame section and having a horizontal pull-out container accommodation element for accommodating the box-shaped container, the pull-out assembly having an attachment mechanism by means of which the pull-out assembly is, in a state attached to the vertical frame section, vertically steplessly positionable relative to the vertical frame section, and
wherein the attachment mechanism has a first operating device for removing the pull-out assembly from and attaching the pull-out assembly to the vertical frame section without the use of tools and/or has a second operating device for fixing the pull-out assembly vertically to the vertical frame section without the use of tools, and
wherein the first operating device comprises a first operating element and/or the second operating device comprises a second operating element, and
wherein the first operating element and/or the second operating element are flap-shaped.

2. The transport vehicle according to claim 1, wherein the attachment mechanism is adapted to vertically fix the pull-out assembly by clamping it to the vertical frame section.

3. The transport vehicle according to claim 1, wherein the first operating element and/or the second operating element are pivotally mounted.

4. A transport vehicle comprising:
a vehicle body having a lower section and a vertical frame section extending upwards from the lower section, the lower section having a storage surface and a container attachment interface for attaching a box-shaped container to the lower section in a state in which the box-shaped container is placed on the storage surface;

a handle arranged on the vehicle body for moving the transport vehicle into a tilted position; and two wheels arranged on the lower section for supporting the transport vehicle in the tilted position relative to a floor and moving the transport vehicle relative to the floor, wherein the transport vehicle has, above the container attachment interface, a pull-out assembly disposed on the vertical frame section and having a horizontal pull-out container accommodation element for accommodating the box-shaped container, the pull-out assembly having an attachment mechanism by means of which the pull-out assembly is, in a state attached to the vertical frame section, vertically steplessly positionable relative to the vertical frame section, and wherein the attachment mechanism has a first operating device for removing the pull-out assembly from and attaching the pull-out assembly to the vertical frame section without the use of tools and/or has a second operating device for fixing the pull-out assembly vertically to the vertical frame section without the use of tools, and wherein the first operating device comprises a first operating element and/or the second operating device comprises a second operating element, and wherein the second operating element is pivotally mounted on the first operating element.

5. The transport vehicle according to claim 2, wherein the first operating element comprises an attachment section engageable with a contact surface provided on the vertical frame section by pivoting the first operating element, in order to mount the pull-out assembly on the vertical frame section.

6. A transport vehicle comprising:

a vehicle body having a lower section and a vertical frame section extending upwards from the lower section, the lower section having a storage surface and a container attachment interface for attaching a box-shaped container to the lower section in a state in which the box-shaped container is placed on the storage surface;

a handle arranged on the vehicle body for moving the transport vehicle into a tilted position; and two wheels arranged on the lower section for supporting the transport vehicle in the tilted position relative to a floor and moving the transport vehicle relative to the floor, wherein the transport vehicle has, above the container attachment interface, a pull-out assembly disposed on the vertical frame section and having a horizontal pull-out container accommodation element for accommodating the box-shaped container, the pull-out assembly having an attachment mechanism by means of which the pull-out assembly is, in a state attached to the vertical frame section, vertically steplessly positionable relative to the vertical frame section, and wherein the attachment mechanism has a first operating device for removing the pull-out assembly from and attaching the pull-out assembly to the vertical frame section without the use of tools and/or has a second operating device for fixing the pull-out assembly vertically to the vertical frame section without the use of tools, and wherein the first operating device comprises a first operating element and/or the second operating device comprises a second operating element, and wherein the first operating element comprises an attachment section engageable with a contact surface provided on the vertical frame section by pivoting the first operating element, in order to mount the pull-out assembly on the vertical frame section, and wherein the first operating element is coupled to the second operating element via an eccentric structure, so that, when the second operating element is pivoted, the attachment section resting on the contact surface is pulled in the direction towards the contact surface, so that the pull-out assembly is clamped to the vertical frame section and is thereby fixed vertically.

7. A transport vehicle comprising:

a vehicle body having a lower section and a vertical frame section extending upwards from the lower section, the lower section having a storage surface and a container attachment interface for attaching a box-shaped container to the lower section in a state in which the box-shaped container is placed on the storage surface;

a handle arranged on the vehicle body for moving the transport vehicle into a tilted position; and two wheels arranged on the lower section for supporting the transport vehicle in the tilted position relative to a floor and moving the transport vehicle relative to the floor, wherein the transport vehicle has, above the container attachment interface, a pull-out assembly disposed on the vertical frame section and having a horizontal pull-out container accommodation element for accommodating the box-shaped container, the pull-out assembly having an attachment mechanism by means of which the pull-out assembly is, in a state attached to the vertical frame section, vertically steplessly positionable relative to the vertical frame section, and wherein the attachment mechanism has an operating element for adjusting the strength of the vertical fixation of the pull-out assembly to the vertical frame section.

8. The transport vehicle according to claim 7, wherein the operating element comprises a knurled nut.

9. The transport vehicle according to claim 1, wherein the pull-out assembly has two support arms on which the container accommodation element is displaceably mounted, wherein a first operating element for removing the pull-out assembly without the use of tools and a second operating element for vertically fixing the pull-out assembly without the use of tools are provided on each support arm.

10. The transport vehicle according to claim 9, wherein the two support arms are connected to each other by two crossing elongate stabilizing elements.

11. The transport vehicle according to claim 1, wherein the container accommodation element is designed as a drawer.

* * * * *